(12) United States Patent
Anchondo (10) Patent No.: US 11,652,657 B2
(45) Date of Patent: May 16, 2023

(54) METHOD TO IDENTIFY MEANINGFUL RELATIONSHIPS BETWEEN USERS WITHIN A GATHERING PLANNING SYSTEM

(71) Applicant: Lucina Anchondo, New York, NY (US)

(72) Inventor: Lucina Anchondo, New York, NY (US)

(*) Notice: Subject to any disclaimer, the term of this patent is extended or adjusted under 35 U.S.C. 154(b) by 0 days.

(21) Appl. No.: 16/938,880

(22) Filed: Jul. 24, 2020

(65) Prior Publication Data

US 2021/0083891 A1    Mar. 18, 2021

Related U.S. Application Data

(60) Provisional application No. 62/878,110, filed on Jul. 24, 2019.

(51) Int. Cl.
*H04L 12/18* (2006.01)
*G10L 25/51* (2013.01)
(Continued)

(52) U.S. Cl.
CPC .......... *H04L 12/1831* (2013.01); *G10L 25/51* (2013.01); *H04L 67/306* (2013.01); *H04L 43/045* (2013.01); *H04L 67/535* (2022.05)

(58) Field of Classification Search
CPC ... H04L 51/23; H04L 67/306; H04L 12/1831; H04L 67/535; H04L 43/045; G06Q 30/0201; G10L 25/51
See application file for complete search history.

(56) References Cited

U.S. PATENT DOCUMENTS 9,286,619 B2 *  3/2016  Alonso ............... G06Q 50/30
10,084,732 B1 *  9/2018  Smarr ................. H04L 51/23
(Continued)

OTHER PUBLICATIONS

Connolly, A., "Why date-rating app Lulu matters for women and men alike," Jun. 23, 2015, thenextweb.com, <https://thenextweb.com/apps/2015/06/23/why-date-rating-app-lulu-matters-for-women-and-men-alike/>.

(Continued)

*Primary Examiner* — Jungwon Chang
(74) *Attorney, Agent, or Firm* — Craige Thompson; Thompson Patent Law; Timothy D. Snowden (57) ABSTRACT

Various embodiments relate generally to dating/friendship finder application systems. An online and in-person gathering system which includes a method for tracking affinity and aversion between users by requesting individual user's feedback on other users based on post-gathering interactions amongst them. System tracks and discloses affinity and aversion feedback towards another user to facilitate decision making with regards to attending or not attending a gathering. Gathering invites are visible or invisible to users based on the affinity and aversion responses from hosts (users planning a gathering) and prospective participant-users. Through empirical affinity and aversion feedback, system identifies proclivity towards personality types defined by the hashtag descriptors provided by users, as well as provide relevant ranking for the presentation of other users, gatherings and $3^{rd}$ party content objects.

17 Claims, 8 Drawing Sheets

(51) Int. Cl.
*H04L 67/306* (2022.01)
*H04L 67/50* (2022.01)
*H04L 43/045* (2022.01)

(56) References Cited

U.S. PATENT DOCUMENTS

| | | | |
|---|---|---|---|
| 10,223,648 B2 | 3/2019 | Tseng et al. | |
| 2014/0172893 A1* | 6/2014 | Carter | G06F 16/9535 707/758 |
| 2015/0350349 A1* | 12/2015 | Kao | G06Q 30/0282 709/204 |
| 2016/0048556 A1* | 2/2016 | Kelly | G06Q 10/10 707/767 |
| 2016/0357870 A1* | 12/2016 | Hentschel | G06Q 50/01 |
| 2017/0300935 A1* | 10/2017 | Herbst | G06Q 30/0201 |
| 2018/0375945 A1* | 12/2018 | Bratsman | G06F 16/909 |

OTHER PUBLICATIONS

Das, M., "Favorsome is Here to Applause Your Credibility," Jan. 27, 2015, Startup Dope, <http://startupdope.com/favorsomereview/>.
Favorsome, "Help people, get credit, earn rewards," favorsome.com Jan. 20, 2021, <https://betalist.com/startups/favorsome>.
Kazmi, M., "Rate-Rate friends," Dec. 26, 2015, Amazon.com, <https://www.amazon.com/Md-Arshad-Kazmi-Rate-friends/dp/B019TY2PJ6>.
Meetup, "Discover events for all the things you love," Jul. 23, 2020, meetup.com, <http://web.archive.org/web/20200723044832/https://www.meetup.com/seo/index/cities/us-ca-san-francisco>.
Meetup, "Viewing event feedback from members," Apr. 20, 2021, meetup.com, <https://help.meetup.com/hc/en-us/articles/360013054151-Viewing-event-feed back-from-members>.
Shandrow, K., "This Creepy, Yelp-Like App Lets You Rate People Like Restaurants," Oct. 1, 2015, entrepreneur.com, <http://web.archive.org/web/20191031023838/https://www.entrepreneur.com/article/251284>.
Socio, "Socio Event App," May 10, 2021, Google Play Store, <http://web.archive.org/web/20210510010922/https://play.google.com/store/apps/details?id=com.atsocio.socio>.
Swapcard, "Swapcard—Smart Event App," Mar. 23, 2021, Google Play Store, <http://web.archive.org/web/20210323201706/https://play.google.com/store/apps/details?id=com.swapcard.apps.android>.
Whova, "Whova—Event & Conference App," Jun. 27, 2021, Google Play Store, <http://web.archive.org/web/20210627222402/https://play.google.com/store/apps/details?id=com.whova.event>.
Wikipedia, "Peeple (mobile application)," Apr. 11, 2020, wikipedia.org, <http://web.archive.org/web/20200529131558/https://en.wikipedia.org/wiki/Peeple_(mobile_application)>.

\* cited by examiner

Fig 6b

METHOD TO IDENTIFY MEANINGFUL RELATIONSHIPS BETWEEN USERS WITHIN A GATHERING PLANNING SYSTEM

CROSS REFERENCE TO RELATED APPLICATION

This application claims benefit to provisional application 62/878,110 filed on Jul. 24, 2019.

BACKGROUND

An international survey conducted by Kaiser Family Foundation and The Economist on loneliness and social isolation in the United States, United Kingdom and Japan shows that enjoyable in-person social interactions are critical for mental and physical health and a contributor to longevity and happier lives. However, in this social media society people are finding themselves engaging in-person less and scrolling, swiping, messaging more. Moreover, due to the busy lifestyle of urban living, planning gatherings to foster deeper connections has become effortful due to the time, money and logistics required to plan a gathering. Therefore, it is an object of the present invention to provide an apparatus and system for facilitating the planning of gatherings, mainly in-person, which includes a post gathering method for tracking affinity and aversion between users and defining personality type proclivity with the goal to promote more face-to-face interactions between the users who find each other likable to yield meaningful relationships.

Traditionally gathering invitations are sent to individuals selected by host unless host makes the invite public. This invention will provide an environment where the host can make the invite public but only to those users that fall within a selected group determined based on a likability index; reducing the efforts spent confirming user participation by allowing any user within the selected group(s) to participate if available and willing. With features such as min/max participants by invite close date, the invitation will automatically cancel, relieving the host from manually cancelling the gathering if the minimum number of participants determined was not met by end of invite close date as well as making the invite invisible to prospective participant-users once the maximum number of participant-users has been met; thus, reducing the logistics efforts once more. Moreover, in traditional gatherings there is not a systematic approach to award good behavior and penalize bad behavior after each gathering.

Each participant-user, will have the option to provide feedback after each gathering to record user's affinity and aversion towards other participants to facilitate decision making with regards to attending or not attending a future gathering as well as limiting the visibility of their own future gathering invite postings, with the goal to promote more face-to-face interactions between the users who find each other likable to yield meaningful relationships Favorsome is a website and mobile application no longer in existence, which consisted in rewarding and acknowledging people for good deeds. Users in the community could receive ratings from other users with the purpose to improve their online reputation. The prior art has the intention for ratings to legitimize a user's online presence. The present invention differs as there is no rating system available for the view of others. The present invention is a tool to facilitate more in-person interactions between users demonstrating affinity towards one another. The representation of the degree of affinity a user may have towards another user is private and solely for decision making purposes with regards to attending or not attending a gathering.

In the context of the body of this specification, a user may be an individual or a non-person entity, such as a business, organization, group.

SUMMARY

Apparatus and method relate to a dating/friendship application system matching individuals online and facilitating in person interactions between users for the purpose of (a) tracking a user's affinity and aversion towards other users (b) facilitating the planning of gatherings, (c) creating a method to alert users of other users attending a gathering, (d) defining a users' personality types through the use of hashtag descriptors, and (d) providing recommendations of new users based on the preferred personality type and type of activities of a user.

Embodiments of the invention provide a mechanism for matching users based on, including but not limited to, common hashtag descriptors, affinity relation to users, proclivity to personality types, locations and interest in activities. The pool of prospective participant-users for a gathering will expand by the matching mechanism; therefore, increasing the probability of gatherings happening between users with reduced planning time and effort. For prospective participant-users, embodiments of the invention easily identify most enjoyable and meaningful participant-users to viewer-user, so viewer-user can determine at-a-glance if gathering is of interest. Degrees of affinity and aversion towards another user is displayed using either color, shapes and/or images or a combination of these. Users may be able to customize associations between the sentiment and user-selectable shapes (e.g. polygons, lines), avatar size, color and/or images (e.g., static icons, moving graphics).

Gathering embodiments are visible depending on the host-user selection of groups based on likability index. Visibility of invite may be also limited to type of gathering activity.

A main objective of this invention is to learn users' affinity to personality types and interest in types of gatherings, meet-ups, and activities to effectively recommend other user with whom user may develop a meaningful relationship through algorithmic modeling. Profile selection, post-gathering survey repetition, gatherings attendance and hashtag descriptors, will be main variables to analyze in order to provide relevant user and gathering recommendations as well as displaying $3^{rd}$ party content objects; eventually expanding the planning process to include curating activities designed for groups of users.

DETAILED DESCRIPTION OF THE INVENTION

All illustrations of the drawings are for the purpose of describing selected versions of the present embodiment and are not intended to limit the scope of the preset method/system. In particular, software solutions may be implemented in a variety of ways while still achieving the same functionality. The embodiments may be represented in its singular or plural form or a combination of the two.

Figure 1:
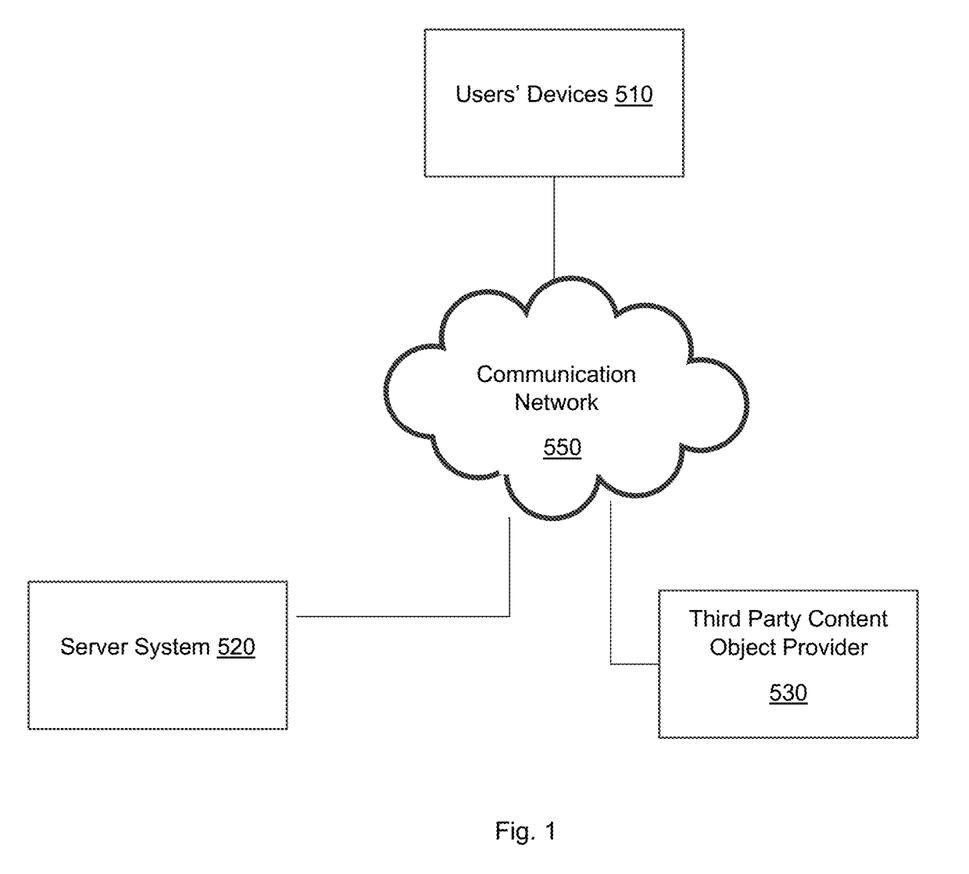
FIG. 1 depicts an example of one embodiment of a system.

FIG. 1 depicts a diagram of an example of one embodiment of a system 500. In this depicted example, a system 500 includes a server system 520 where user information, user interactions, communications between users, matched connections, proposed gatherings, hashtag descriptors, user feedback on other users, among other information is captured. System 500 is the platform where other systems, such as third-party providers 530 may provide products and services, including informational content to users. Third-party providers 530 may provide one or more third-party content objects, and the third-party providers 530 may be separate from the server system 520. The server system 520 and third-party providers 530 may be operated by different entities. The system 500 also includes one or more user devices 510. The user devices 510 may include one or more computing devices to transmit and receive data via a communications network 550. The communications network 550 may include any combination of local area and/or wide area networks, using both wired and wireless communication systems. The user devices 510 are configured to communicate with third-party providers 530 and the server system 520 via the communications network 550.

Figure 2:
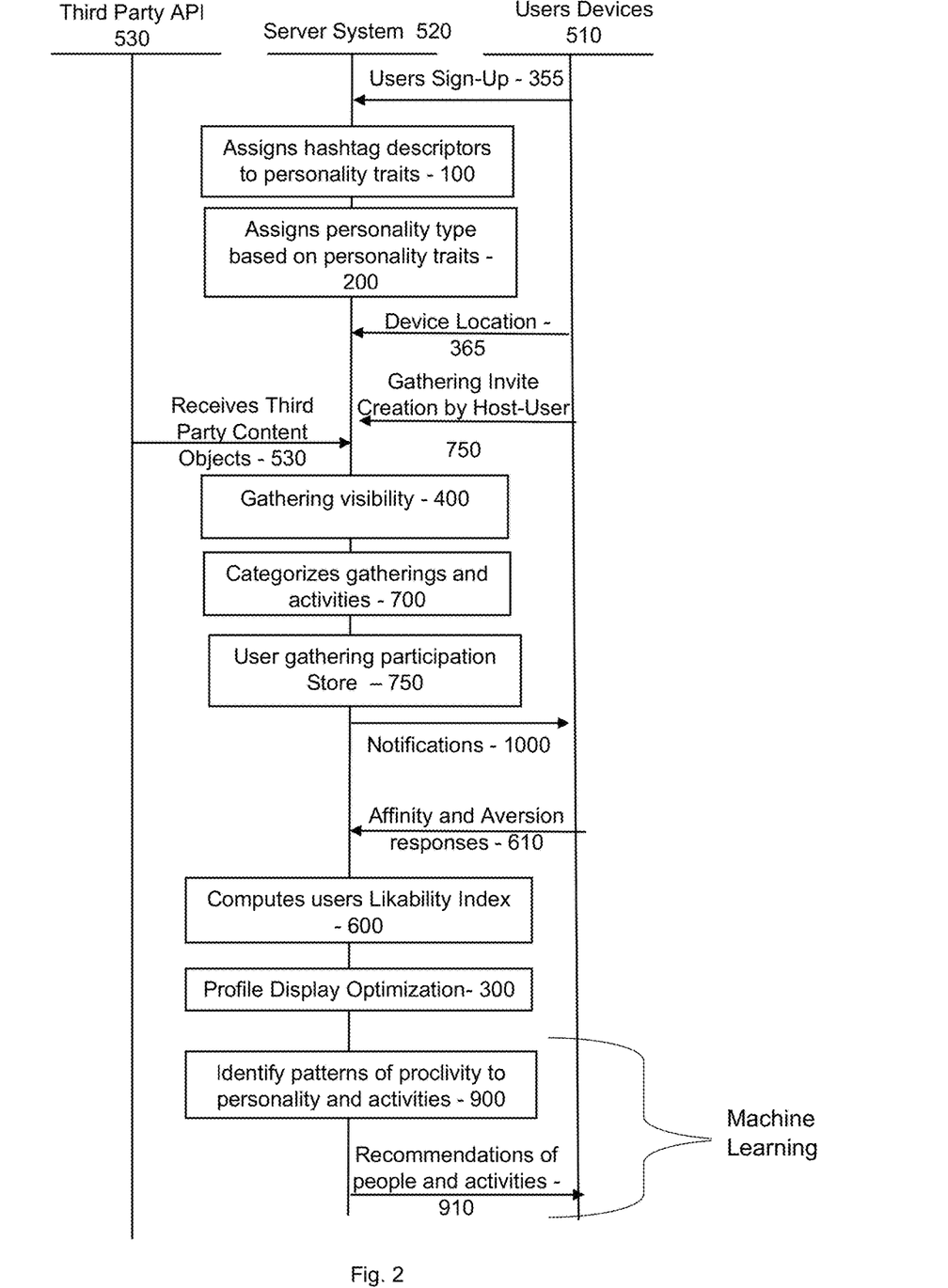
FIG. 2 depicts an exemplary interaction diagram of the process for user communication with systems.

FIG. 2 depicts an exemplary interaction diagram of the process for user's devices 510, third-party providers 530 and server system 520. FIG. 2 depicts the most relevant steps for user communication with server system 520; interactions with users, gathering planning, identifying and recording personality type proclivity patterns. Initially, users via 510 provide 520 with information about the user, including but not limited to, date of birth, home base city, Zip Code and certain preferred parameters, i.e. user sign-up 355. This information will be stored in user profile store 350 along with other content objects provided by user, including hashtag descriptors, photographs and videos provided by user. The information provided by users via 510 may be through the access of third-party content objects 530 such as Facebook or Instagram. Predetermined or self-reporting hashtag descriptors provided by user in user sign-up stage, will be assigned with personality traits in the hashtag descriptors module 100. A personality type will be derived 200 based on the user's assigned personality traits. Server system 520 receives from user device 510 information about the user location 365, directly from the information last stored in user device 510 or by GPS. If user has built connections outside home base city and/or zipcode, the option to access gatherings near user is available by giving server system 520 permission to access user device location 365. Server system 520 may access location information at time of engagement with user device 510 or predetermined time intervals. Server system 520 determines a location value 365 based on the proximity between users and location of gatherings to sort in gathering visibility manager module 400 according to user distance preference. Third parties content objects 530 may be received by server system 520 based on user type of gathering planned (e.g. Dinner Party, Dining Out, Hiking, etc.) and location 365. The third-party content objects 530 may be for informational purposes only or may include links to third party providers of goods and services and/or third-party provider's incentives, such as discounts or coupons. As used herein, "host-user" are users that proactively become hosts or organizers by organizing gatherings and "prospective participant-user" are users in groups selected by "host-user" to view the gathering invite and "participant-user" is a user who has joined a gathering. Host-user's posting of a gathering invite 750 may prompt server system 520 to send a push notification, text message or email 1000 to prospective participant-users' devices. Moreover, the participation of a user in a gathering may trigger other notifications to connections of participant-users up to the degree of separation selected by host-user. Visibility of gathering invite is managed in gathering visibility manager module 400. In the gathering and activity classifier module 700 gatherings are classified determined based on hashtags descriptors used in the gathering invite, element 100a from FIG. 5b. Gathering information is stored in Gathering Store 750 database. Server system 520 prompts a post-gathering likability survey 610 in participant-users' devices 510 after each gathering to record affinity and aversion towards other participant-users in attendance of gathering, exemplary embodiment in FIG. 5a. Responses obtained from the survey are stored in user profile store 350 and updated as users engage in future gatherings, adjusting the likability index of users. Likability Index module 600 is determined based on various variables and weights determine based on aggregate affinity and aversion responses from other users, personality type of user and respondent users, proclivity to type of activities, aspirational categories and participation in gatherings. Index may be constructed using a simple composite index by assigning scores for responses, or may use multivariate statistical technique, such as exploratory factor analysis and principal component analysis. Additionally, based on user hashtag descriptors and gathering engagement, server system 520 will recognize type of gatherings and activities a user is drawn to for future recommendations of activities and social events via the profile display optimization 300. As metadata is compiled for each user, through the application of machine learning characteristics 900, patterns in user proclivity to personality types and types of activities may be identified in order to prioritize the display of other user profiles and gathering invites to users 910. A main objective of this invention is to learn users' affinity to personality types and interest in types of gatherings, meet-ups, and activities to effectively recommend other user with whom user may develop a meaningful relationship. Profile selection, post-gathering survey repetition, gatherings attendance and hashtag descriptors, will be main variables to analyze in the curating module 900. The curating module will refine it's learning of users' affinity to personality types and activities to provide meaningful recommendations to users 910. The curating module 900 will apply feature engineering principles to build an algorithmic model and train it to make predictions of the types of personality and activities a user finds appealing and meaningful.

Figure 3A:
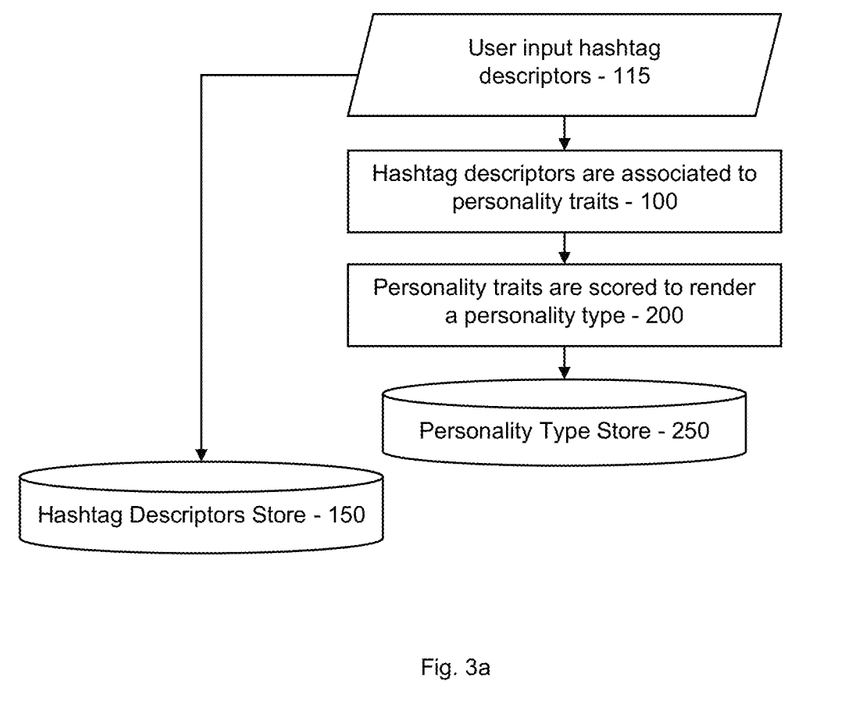
FIG. 3a is an embodiment of a method flow diagram of the relevant steps with regards to assigning personality traits to hashtag descriptors.

FIG. 3a is an embodiment of a method flow diagram of the relevant steps with regards to assigning personality traits to hashtag descriptors. Based on hashtag descriptors provided by users 115, matching process 310 displays profiles of other users based on hashtag descriptors commonalities. Hashtag descriptors may be identical or may show similarity in concept. For example, if one user includes a #cancersurvivor as a description of oneself and another user inputs #survivingcancer, these profiles may be considered as having a common hashtag. Users reviewing other users' profiles can add to own profile other user's hashtag descriptors, facilitating the creation of micro-groups within the user community 115. FIG. 6b is an exemplary screenshot of how the hashtag descriptors are displayed on a user's profile and available to be added to own profile. Predetermined or self-reporting hashtag descriptors may be associated with personality traits in the hashtag descriptors module 100. Server system 520 may infer two users having common hashtags based on assigned personality trait to the hashtag, e.g. #environmentalist and #vegetarian, both may have the trait of thoughtful, or if a user includes #bungeejumping as an interest, system may infer user as having affinity to other high-risk activities. The traits may be used to define a personality type of user 200 determined based on the number of traits that fall within a personality type. Method of determining a personality type may incorporate the use of metadata captured from users' interactions and responses, as well as the studies of one or a combination of known psychologists in the theory of psychological functions. Hashtags descriptors are stored in a database 150 and personality type are stored in database 250.

Furthermore, through application programming interface, hashtags that are trending in other social networks may be displayed to feed the hashtag descriptors store and facilitate for the formation of micro-groups within the community or gatherings appealing to the users interested in said hashtags.

Figure 3B:
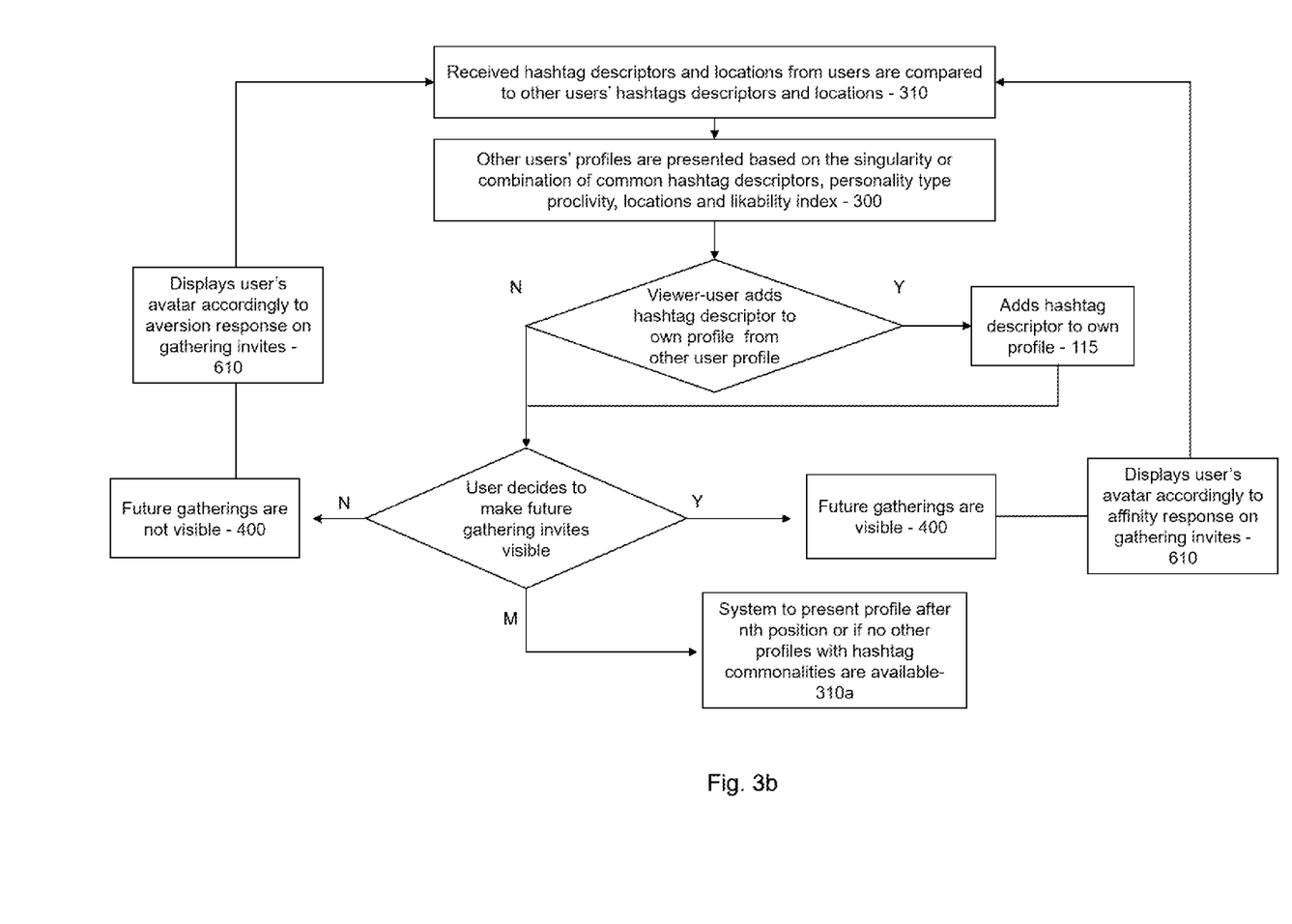
FIG. 3b is an embodiment of a method flow diagram of the relevant steps with regards to determining visibility of gathering invites.

FIG. 3b is an embodiment of a method flow diagram of the relevant steps with regards to determining visibility of gathering invites. Based on the hashtag descriptors commonalities and locations of users, matching process 310 will prioritize the display of profiles a viewer-user sees. A viewer-user then decides to make own future gathering invites visible or not to user, subject of the profile in review. The user may elect to omit from the gathering feed gathering invites of other users with whom viewer-user has shown aversion towards, all of this is managed through the gathering visibility manager module 400. As users participate in gatherings and provide responses to affinity and aversion towards other users, the avatar of participant-users in a gathering will be displayed using either color, shapes and/or images or a combination of these, wherein said images may be selected from statics icons, moving graphics reflecting the affinity and aversion degree 610. Said color, shapes and/or images may also be used to categorize a user based on type of affiliation, wherein said affiliation comprising professional, emotional or activity. The affinity and aversion responses will be used to compute a likability index 600. Said likability index may be incorporated as a variable in the profile display optimization 300. Users with a high likability index will have priority in the profile display ranking. Viewer-users may use the option of postponing a decision to make own future gathering invites visible to other users by choosing the option Maybe 310a.

Figure 4A:
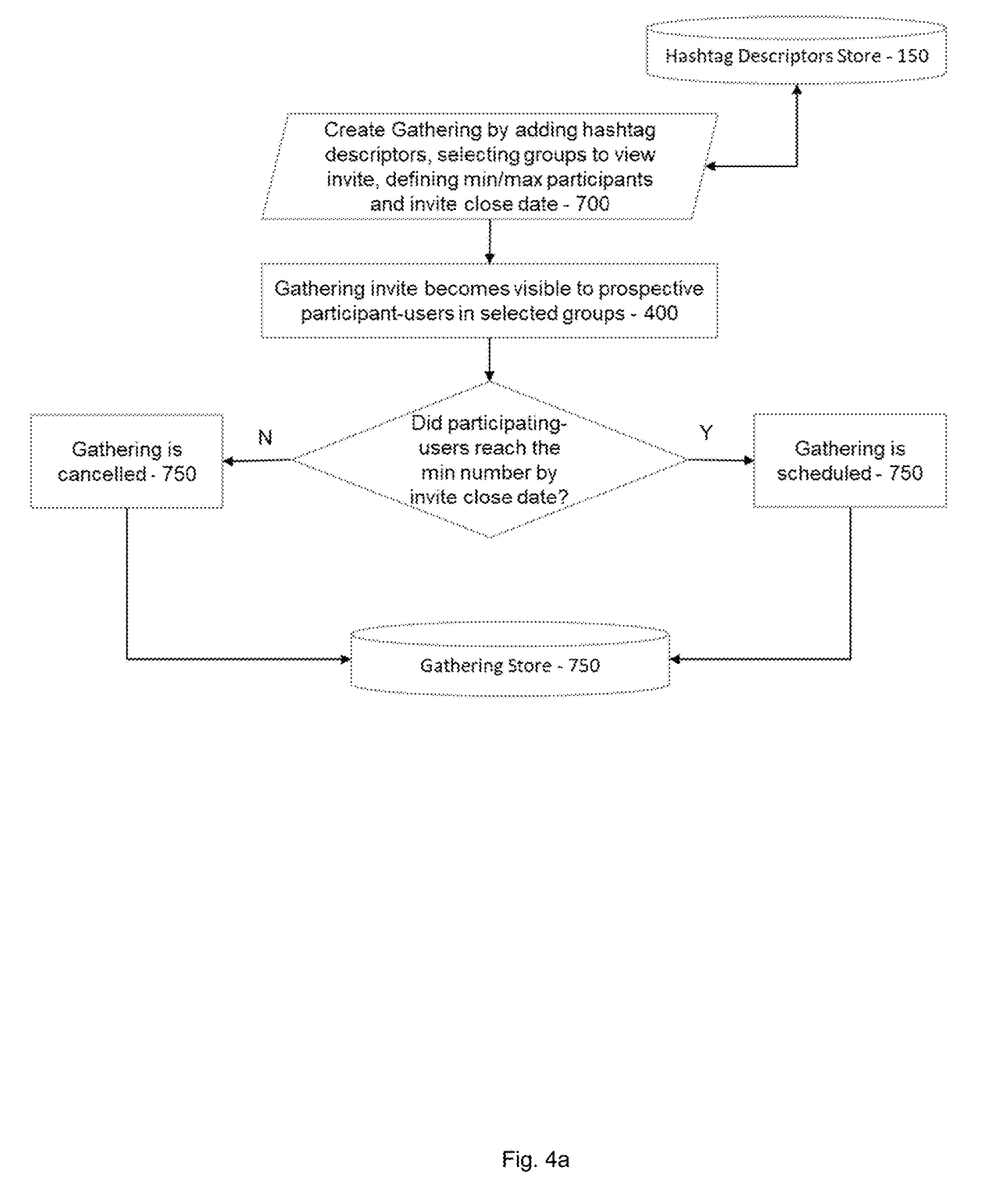
FIG. 4a is an embodiment of a method flow diagram of the relevant steps with regards to creating a gathering.
Figure 5A:
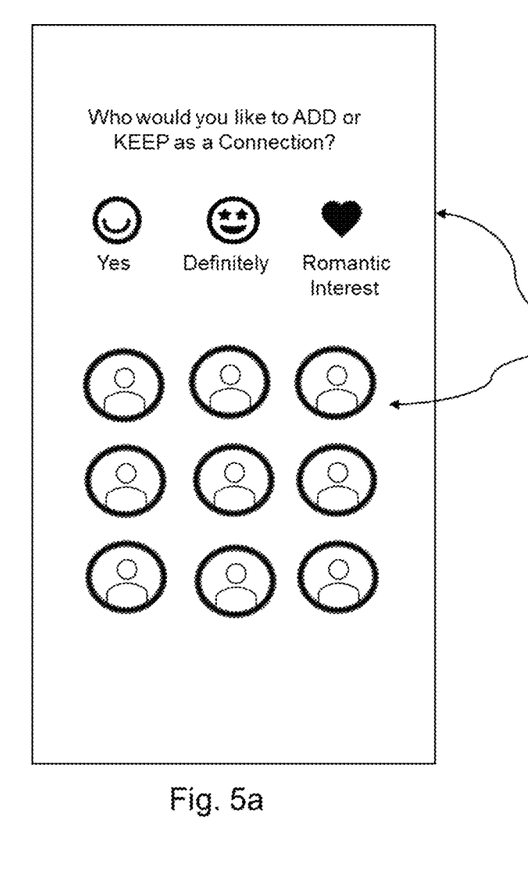
FIG. 5a is an example of a screenshot illustration of how the survey will be presented to participant-users of the gathering.
Figure 5B:
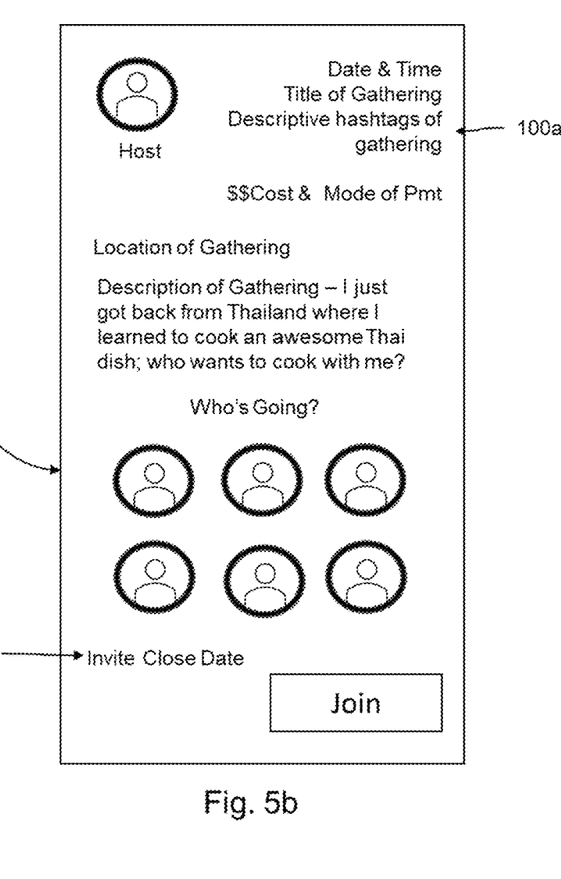
FIG. 5b is an example of a screenshot illustration of how a gathering invite may be displayed to users

FIG. 4a is an embodiment of a method flow diagram of the relevant steps with regards to creating a gathering. Users need to proactively post invites to gather. Host-user may select to invite all other users or selected groups based on degrees of affinity, depicted by color, shape and/or images. Based on host-user choices, server system 520 sends a push notification, text message or email to user devices 510 of selected groups. Moreover, the participation of a user in a gathering may trigger other notifications to connections of participant-users up to the degree of separation selected by host-user. Users in the selected group(s) will then be able to view the gathering invite and join if so desired. FIG. 5b is an example screenshot illustration of how user device 510 may display the invitation details. In the gathering and activity classifier module 700 gatherings are classified determined based on hashtags descriptors used in the gathering invite, element 100a from FIG. 5b. Hashtag descriptors are stored in Hashtag Descriptors Store 150 database and Gathering information is stored in Gathering Store 750 database.

Figure 4B:
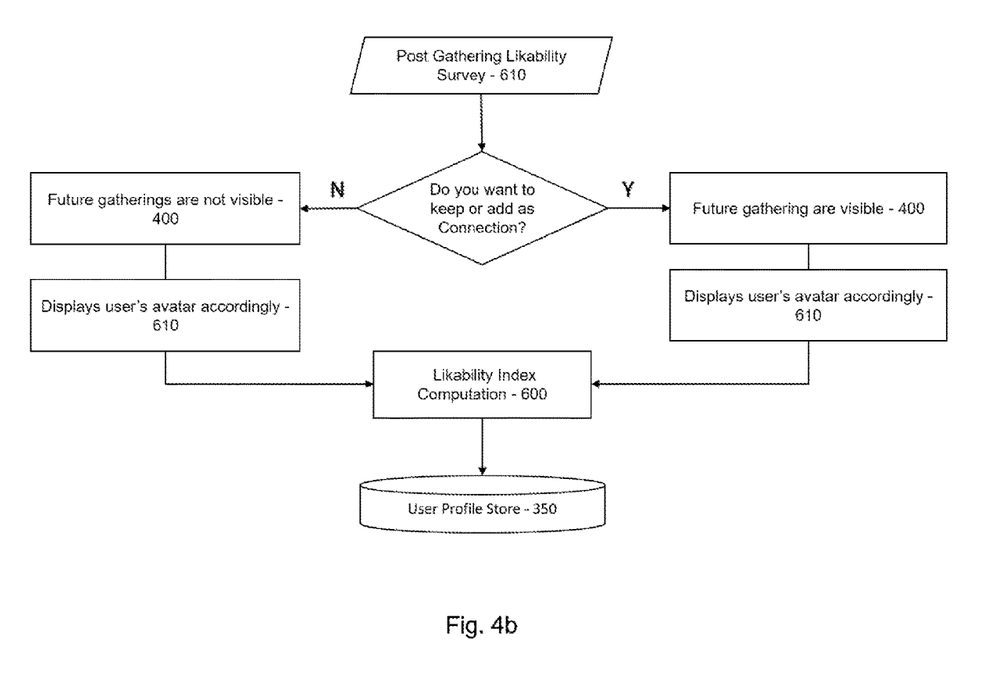
FIG. 4b is an embodiment of a method flow diagram of the relevant steps of the post gathering survey.

FIG. 4b is an embodiment of a method flow diagram of the relevant steps of the post gathering survey. This process is important to achieve the desired outcome of the apparatus/method. A post-gathering survey is necessary to begin recording users' affinity and aversion towards other users after in-person interactions have taken place. FIG. 5a is an example of a screenshot illustration of how the survey will be presented to user/attendee of the gathering. The affinity and aversion responses towards participant-users may be recorded by tapping, swiping, dropping, etc. on an avatar to designate the degree of affinity and aversion respondent has towards a participant-user. As users interact with one another in future gatherings, the likability index 600 will be adjusted to reflect aggregate responses. The surveys may trigger the activation or deactivation of notifications. For example, if user A's response is aversion towards user B notifications to user A's device about user B's attendance or hosting of gatherings will cease, as well as the notifications to user's B device about user A's attendance or hosting of gatherings. The survey also updates the visibility of gatherings in the gathering visibility manager module 400. User responses to affinity and aversion towards other users stored in in the user profile store 350.

FIG. 5a is an example of a screenshot illustration of how the survey will be presented to participant-users of the gathering. In the visibility manager module will configured to display the latest affinity and aversion degree per participant-user on a gathering invite. The avatar of participant-users in a gathering will be displayed using either color, shapes and/or images or a combination of these, wherein said images may be selected from statics icons, moving graphics reflecting the affinity and aversion degree 610a. Thus, making it easy for viewer-user to decide if the gathering is worth viewer-user's time. The configuration of how an avatar is displayed can also alert or warn a user of a participant-user that made user feel unsafe, threaten, or harassed in the past. This alert or warning mechanism is a safety measure for users to avoid putting themselves in an uncomfortable situation and avoid the gathering altogether. A likability symbol, be it a circle, prismatic background to mention a couple, may be included as participant-users join, to further facilitate ascertaining at a glance how enjoyable a gathering is expected to be for viewer-user from the participant-users joining.

FIG. 5b is an example of a screenshot illustration of how a gathering invite may be displayed to users and where users can opt to join. One of the objectives of this invention is to streamline the gathering planning, logistics and execution.

Minimum and Maximum guests will prompt the invitation to automatically confirm the gathering once the minimum is reached, leaving it open until the Invite Close date 700*a*. Invites may be notified via a push notification, text messages or email to prospective participant-users and, if Host so elects, to other users participant-users have affinity towards up to the specified degree of separation. Hashtags descriptors used in a gathering invite, element 100*a*, may be scored determined based on likelihood of physical hazard and severity in gathering and activity classifier module 700. Other relevant information, such a contribution amount for gathering, specific themes, etc. may be included as part of the invite.

Figure 6A:
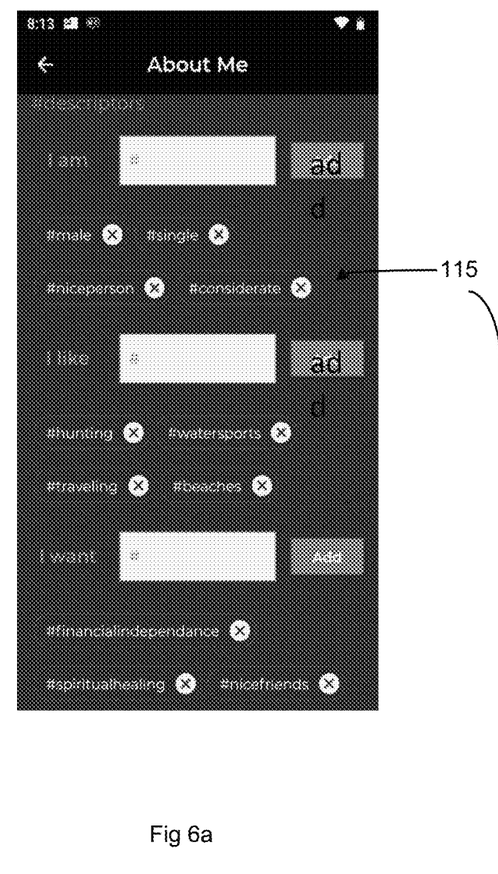
FIG. 6a is an example of a screenshot for adding hashtag descriptors describing oneself, interests, and aspirations.
Figure 6B:
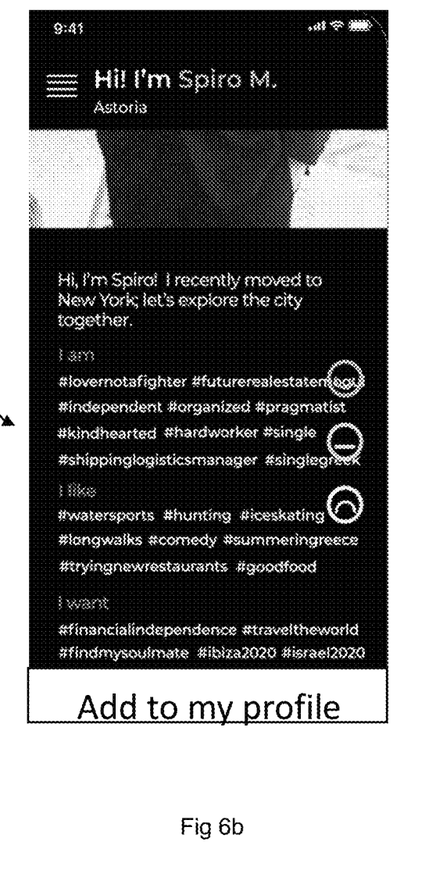
FIG. 6b is an example of a screenshot for how the hashtag descriptors may be displayed in a user profile.

FIG. 6*a* is an example of a screenshot for adding hashtag descriptors describing oneself, interests and aspirations, element 115. The selection of predetermined hashtag descriptors as well as self-reporting hashtag descriptors are the building blocks to determine a personality type associated to a profile. A user, via device 510, will input self-reporting hashtag descriptor or elect hashtag descriptors from the hashtag descriptor store 750, to best describe own personality traits, interests and aspirations. Hashtags descriptors not identifiable to be associated to a personality trait, interest or aspiration will not influence how a personality type is defined.

FIG. 6*b* is an example of a screenshot for how the hashtag descriptors may be displayed in a user profile. Users reviewing other users' profiles can add to own profile other user's hashtag descriptors, facilitating the creation of micro-groups within the user community, element 115.

Although various embodiments have been described with reference to the figures, other embodiments are possible. For example, some bypass circuits implementations may be controlled in response to signals from analog or digital components, which may be discrete, integrated, or a combination of each. Some embodiments may include programmed and/or programmable devices (e.g., PLAs, PLDs, ASICs, microcontroller, microprocessor), and may include one or more data stores (e.g., cell, register, block, page) that provide single or multi-level digital data storage capability, and which may be volatile and/or non-volatile. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an exemplary system 500 has been described with reference to FIG. 1, other implementations may be deployed in other industrial, scientific, medical, commercial, and/or residential applications.

Some embodiments may provide a method of matching individuals according to common hashtag descriptors on users' profiles, including the use of plurality of other users' responses regarding affinity or aversion towards other users. Some embodiments may provide a method of users to easily plan gatherings and distribute the cost of the gathering. Some embodiments may provide a method for users to be automatically notified when another matched user is attending or hosting a gathering. Some embodiments may provide a method of capturing feedback from users regarding how likable they found other users who assisted at the gathering and thus creating a method of alerting the attendance of liked and disliked users at future gatherings. Some embodiments may provide a method of recommending a user individuals and/or groups of individuals and events based on the likability index of the user.

Although particular features of an architecture have been described, other features may be incorporated to improve performance. Some systems may be implemented as a computer system that can be used with implementations of the apparatus/method. For example, various implementations may include digital and/or analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of the apparatus/method by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. The apparatus/method may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

The invention claimed is:

1. A computer-implemented method performed by at least one processor to provide visual indicia of social affinity in a communication network, the method comprising:

in response to determining, based on gathering information retrieved from a gathering datastore, that a predetermined social gathering has ended in which a plurality of users participated, then provide, by a processor, a post-gathering likability survey to a corresponding device of each of the plurality of users, wherein the survey provided to each of the plurality of users is based on predetermined user profiles corresponding to the plurality of users and on an association between the predetermined user profiles and the predetermined social gathering;

receive, from a first device of the corresponding devices, the first device being associated with a first user of the plurality of users, an electronic message corresponding to input of the first user in response to the post-gathering likability survey received by the first user;

receive a signal from the first device of the first user corresponding to a hashtag descriptor, the hashtag descriptor corresponding to a personal attribute of the first user;

receive a plurality of trending hashtags in a social networks;

associate the hashtag descriptor with a first user profile;

determine the response of the first user from the electronic message and associating the response with the first user profile of the predetermined user profiles, the first user profile being associated with the first user and stored in a user profile datastore;

determine a personality trait based on at least one personality trait associated with the hashtag descriptor associated with the first user profile;

associate the personality trait with the first user profile;

determine a first personality type of the first user based at least on the personality traits associated with the first user profile of the first user;

determine a target personality type for a third user, based on predetermined levels of affinity or aversion associated with a second user profile of the third user for each of a group of users having the target personality type, wherein each of the levels of affinity or aversion are determined based on a response of the third user to interaction with a corresponding user of the group of users;

determine if the personality trait corresponds to at least one of the plurality of trending hashtags;

when the personality trait corresponds to at least one of the plurality of trending hashtags, then determine the third user corresponding to the personality trait:

retrieve, from the user profile datastore, the second user profile associated with the third user;

generate a display of the second user profile for display to the first user;

generate, when the first personality type matches the target personality type, a display of the first user profile for display to the third user; and, generate, for display on a second device of a second user, a visual affinity and aversion indicium corresponding to the first user, wherein the second user is one of the plurality of users and the visual affinity and aversion indicium is generated based on a response of the second user to the post-gathering likability survey, the response of the second user corresponding to an affinity or aversion response of the second user to the first user corresponding to the predetermined social gathering.

2. The computer-implemented method of claim 1, further comprising:

generate, by a likability index module, a likability index for the first user based on aggregate affinity and aversion responses to the first user determined from responses received from other users; and, associate the likability index with the first user profile in the user profile datastore.

3. The computer-implemented method of claim 2, wherein the likability index is generated based on variables and weights determined based on the aggregate affinity and aversion responses to the first user.

4. The computer-implemented method of claim 2, further comprising:
- receive, from a third device, a gathering signal corresponding to a future social gathering;
- generate a gathering information data structure from the gathering signal and store the gathering information data structure in the gathering datastore;
- determine if the likability index of the first user meets a visibility criteria associated with the gathering information data structure for the future social gathering; and,
- when the likability index of the first user meets the visibility criteria, then generate, for display on the first device, a gathering profile for the future social gathering based on the gathering information data structure.

5. The computer-implemented method of claim 1, wherein the visual affinity and aversion indicium comprises a color selected based on a predetermined association of the color with a level of affinity or aversion.

6. The computer-implemented method of claim 1, wherein the visual affinity and aversion indicium comprises a shape selected based on a predetermined association of the shape with a level of affinity or aversion.

7. The computer-implemented method of claim 1, wherein the visual affinity and aversion indicium comprises an image selected based on a predetermined association of the image with a level of affinity or aversion.

8. The computer-implemented method of claim 7, wherein the image comprises at least one of: a static icon, and a moving graphic.

9. The computer-implemented method of claim 1, wherein the visual affinity and aversion indicium is selected based on a predetermined affiliation of the first user determined based on the first user profile.

10. The computer-implemented method of claim 9, wherein the predetermined affiliation comprises an association of the first user with at least one of: a profession, and an activity.

11. The computer-implemented method of claim 1, wherein the hashtag descriptor comprises a predetermined hashtag selected by the first user.

12. The computer-implemented method of claim 11, wherein the personality trait is determined based on a proclivity of the first user to a type of activity corresponding to the hashtag descriptor.

13. The computer-implemented method of claim 12, wherein the personality trait is determined based on at least one of: a likelihood of physical hazard of the type of activity, a severity of the type of activity.

14. The computer-implemented method of claim 1, wherein the hashtag descriptor comprises a previously presented hashtag generated by the first user.

15. The computer-implemented method of claim 1, further comprising: generate a display of the plurality of trending hashtags for the first user to associate with the first user profile.

16. The computer-implemented method of claim 15, wherein determine if the personality trait corresponds to at least one of the plurality of trending hashtags comprises determining commonalities between the hashtag descriptor and the plurality of trending hashtags.

17. The computer-implemented method of claim 15, further comprising:
- determine a first location of the first user based on a signal received from the first device;
- determine a second location of the third user based on a signal received from a third device associated with the third user;
- determine a user distance preference of the first user based on the first user profile; and,
- generate a display, for display to the first user, of gatherings located within the user distance preference,
- wherein generate a display of the second user profile for display to the first user is performed when a proximity between the first location and the second location is determined to meet the user distance preference.

* * * * *